No. 794,709. PATENTED JULY 18, 1905.
A. O. GUTSCH.
BOTTLE LABELING MACHINE.
APPLICATION FILED APR. 10, 1905.

5 SHEETS—SHEET 1.

Witnesses:
Geo. W. Young.
N. E. Oliphant.

Inventor:
Alfred O. Gutsch
By H. G. Underwood
Attorneys.

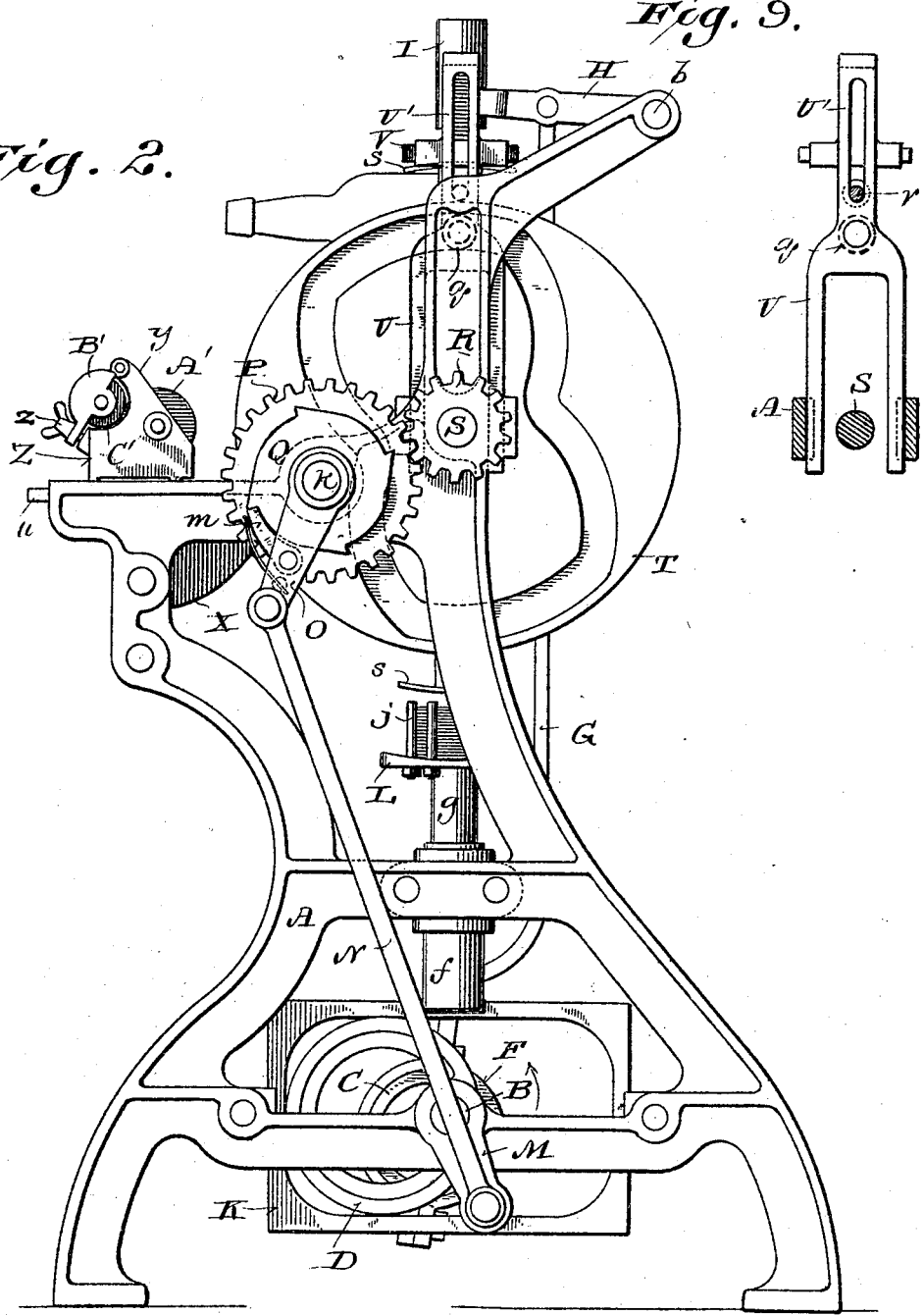

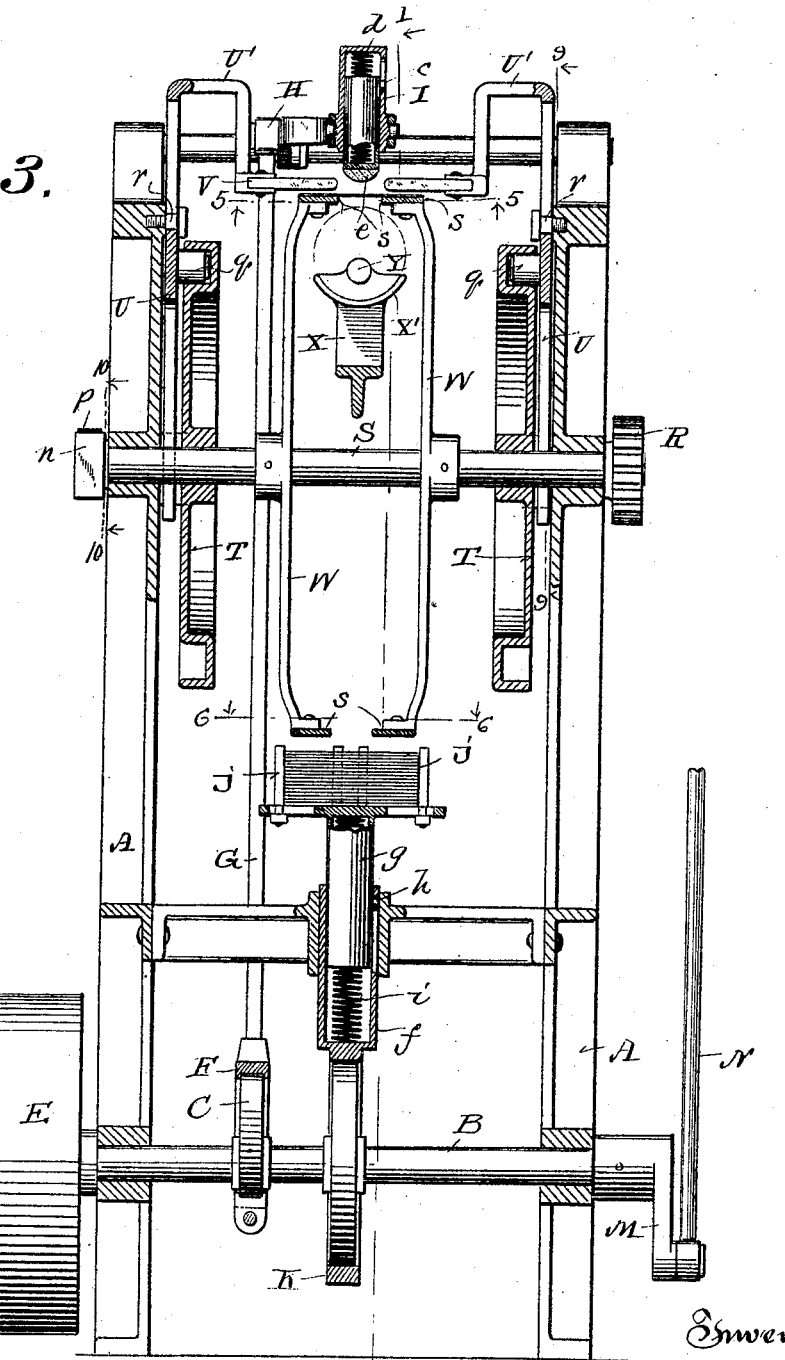

No. 794,709. PATENTED JULY 18, 1905.
A. O. GUTSCH.
BOTTLE LABELING MACHINE.
APPLICATION FILED APR. 10, 1905.

5 SHEETS—SHEET 4.

No. 794,709. PATENTED JULY 18, 1905.
A. O. GUTSCH.
BOTTLE LABELING MACHINE.
APPLICATION FILED APR. 10, 1905.
5 SHEETS—SHEET 5.
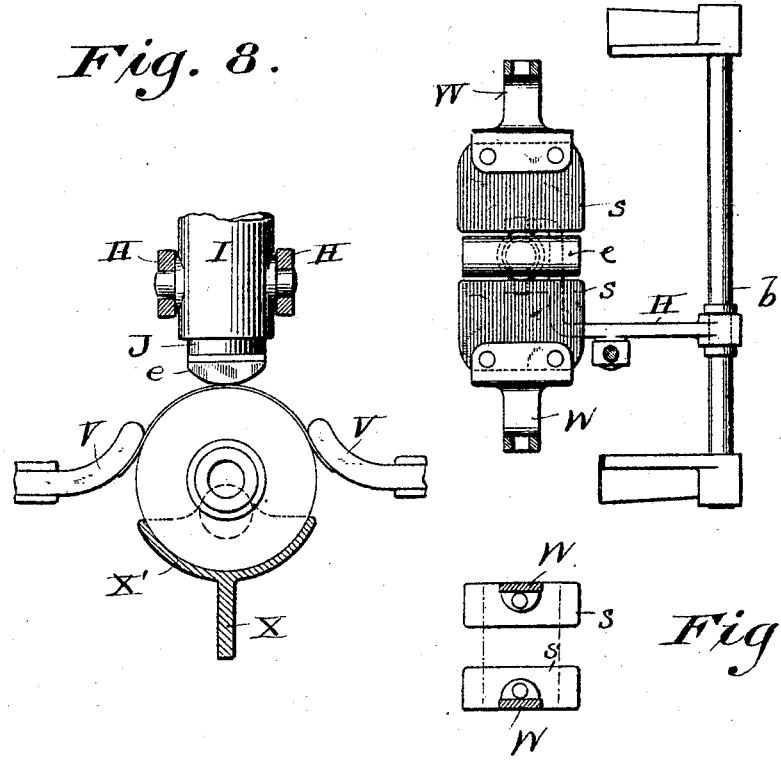
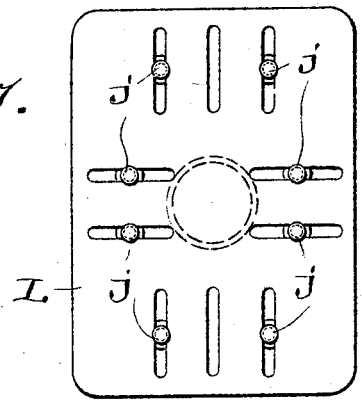
Witnesses:
Geo. W. Young.
N. E. Oliphant.
Inventor:
Alfred O. Gutsch
By H. G. Underwood
Attorneys No. 794,709.

Patented July 18, 1905.

UNITED STATES PATENT OFFICE.

ALFRED O. GUTSCH, OF SHEBOYGAN, WISCONSIN.

BOTTLE-LABELING MACHINE.

SPECIFICATION forming part of Letters Patent No. 794,709, dated July 18, 1905.

Application filed April 10, 1905. Serial No. 254,812.

*To all whom it may concern:*

Be it known that I, ALFRED O. GUTSCH, a citizen of the United States, and a resident of Sheboygan, in the county of Sheboygan and State of Wisconsin, have invented certain new and useful Improvements in Bottle-Labeling Machines; and I do hereby declare that the following is a full, clear, and exact description thereof.

My invention consists in certain peculiarities of construction and combination of parts hereinafter particularly set forth with reference to the accompanying drawings and subsequently claimed, the object of said invention being to provide simple, economical, and efficient bottle-labeling machines.

Figure 1:
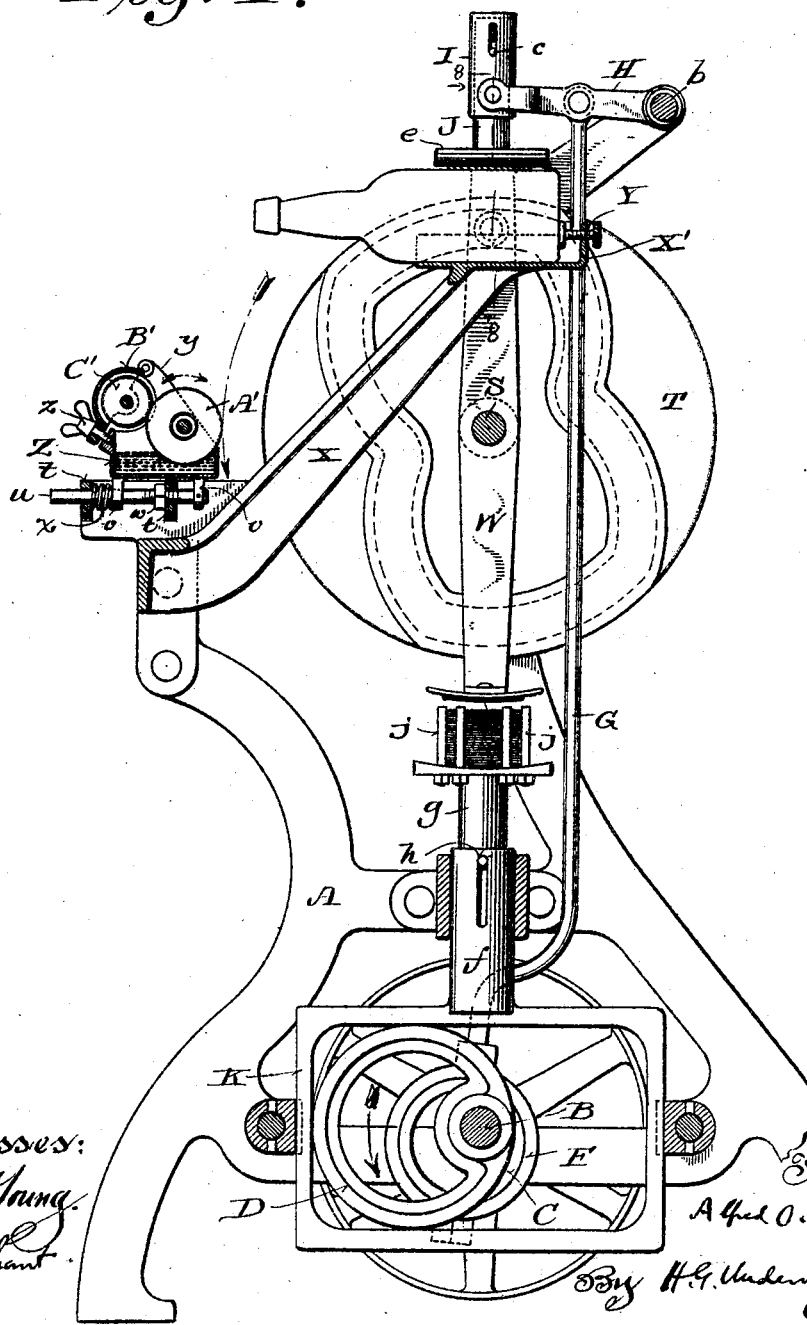
Figure 10:
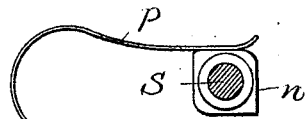
Figure 4:
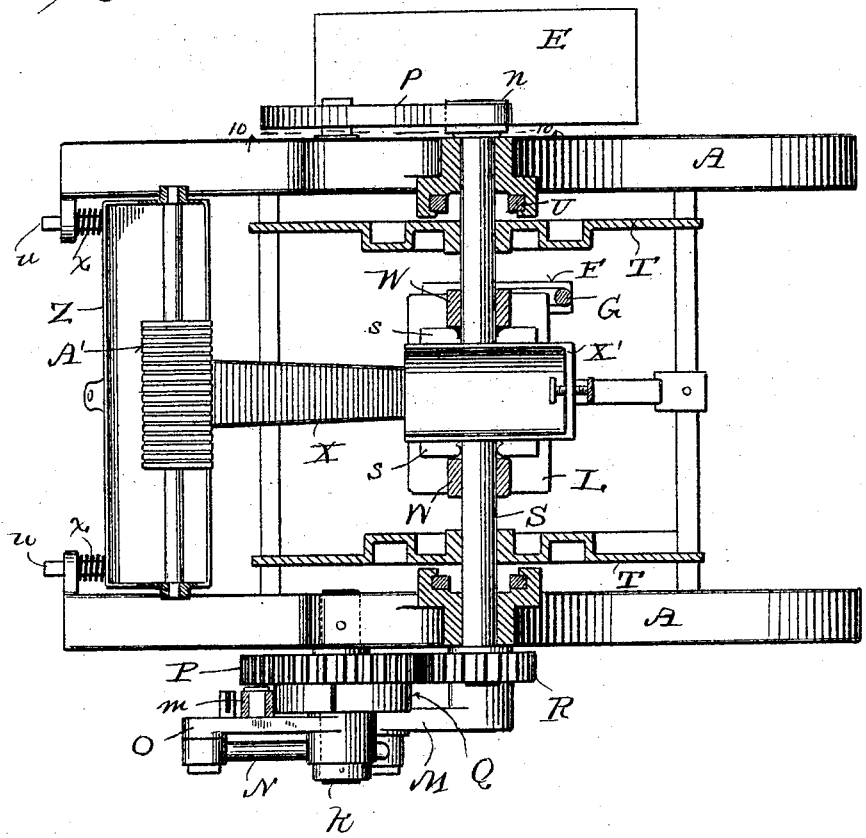

Figure 1 of the drawings represents a vertical sectional view of a bottle-labeling machine in accordance with my invention and is indicated by line 1 1 in Fig. 3; Fig. 2, a side elevation of the machine; Fig. 3, a rear elevation of the same, partly in transverse section; Fig. 4, a plan view of the machine, partly in horizontal section; Figs. 5 and 6, partly sectional views of fragments of the machine and respectively indicated by lines 5 5 and 6 6 in Fig. 3; Fig. 7, a plan view of the label-holder in the machine; Figs. 8, 9, and 10, partly sectional views of fragments of the machine, the same being respectively indicated by line 8 8 in Fig. 1 and lines 9 9 and 10 10 in Fig. 3. Fig. 10 is also indicated by line 10 10 in Fig. 4.

Referring by letter to the drawings, A indicates each of a pair of suitably-connected side standards of the machine provided with bearings for a main shaft B, having eccentrics C D fast thereon, said shaft being also provided with a pulley E for a driving-belt. A ring F, surrounding the eccentric C, is connected by a pitman G with a lever H, that is fulcrumed on a rod $b$, connecting upper rear arms of the standards aforesaid, and the lever has spanner connection with trunnions of a longitudinally-slotted vertical casing I, engaged by a hollow plug J, held therein against rotary movement by a lug $c$ engaging the slot. A spiral spring $d$ is under tension within the casing and plug, and a preferably convex cushion $e$, of rubber, felt, or other suit- able material, is fast on the lower outer end of said plug.

The eccentric D of the main shaft B turns in a cross-head K, having a hollow vertical shank $f$ guided in a cross-brace of the machine. Engaging the cross-head shank is the depending hollow shank $g$ of a preferably concave horizontal plate L, and said cross-head shank is provided with a longitudinal slot engaged by a lug $h$ of the plate-shank to prevent rotary movement of the plate. A spiral spring $i$ is under tension in the shanks of the cross-head and plate, and said plate is provided with longitudinal and transverse slots engaged by the lower ends of shouldered pins $j$, that are held in adjusted position in said slots by means of clamp-nuts. The plate, with its shank and pins, constitutes what is hereinafter termed the "label-holder" of the machine, said pins being adjustable to accommodate the holder to various sizes of labels.

A crank M is fast on the main shaft B and connected by a link-rod N with another crank O, loose on a stud $k$ of one of the aforesaid standards. A spur-wheel P is also loose on the stud $k$ and provided with a ratchet extension Q, engaged by a spring-controlled pawl $m$ in pivotal connection with the crank O, above specified. The spur-wheel meshes with a pinion R, fast on a counter-shaft S, for which the standards aforesaid are provided with bearings. One end of the counter-shaft is provided with a squared head $n$, and a spring $p$ is arranged to bear on the head to prevent overrunning of said shaft.

Fast on the counter-shaft are disks T, each provided with a cam-groove engaged by a roller $q$ on a stud of a yoke U, that straddles said shaft and is guided in the adjacent standard of the machine. Angular upper shanks U' of the yokes are longitudinally slotted, and the slots are engaged by guide-screws $r$, set in the aforesaid standards. The inner horizontal ends of the yoke-shanks are attached to wipers V, of felt, rubber, or other suitable material. Between the cam-disks are parallel bars W, having central hubs fast on the counter-shaft, and riveted or otherwise fastened to inturned ends of the bars are preferably curved plates *s*, said bars and the plates therewith being what are hereinafter termed "label-pickers."

An inclined arm X of the machine has its upper end in the form of a bottle-rest X' below the cushioned end of the plug J aforesaid, and a bottle-stop Y has screw-thread adjustment in the vertical back of the bottle-rest.

Guided in lugs *t* of the standards A are rods *u*, fast in depending lugs *v* of a paste-holder Z, and a stop-nut *w* is adjustable on a screw-threaded portion of each rod to oppose a standard-lug. Spiral springs *x* are arranged on the rods *u* between lugs of the aforesaid standards and paste-holder. A preferably fluted roller A' has the arbor thereof journaled in the ends of the paste-holder, and in pivotal connection with arms *y* of said ends of the paste-holder is a hood B', in which the arbor of another preferably fluted roller C' is journaled. The fluted rollers are arranged to mesh one with the other, and the roller C' acts to prevent too much paste being carried up by the roller A' when the machine is in operation. The pressure of the roller C' is regulated by a thumb-screw *z*, that extends through a center lug of the hood B' into a similar lug of the paste-holder.

From the foregoing it will be understood that when the main shaft of the machine is in rotation the counter-shaft has intermittent rotation. At each half-revolution of the counter-shaft one of the label-pickers is alined with the label-holder and the other label-picker and a label therewith are over a bottle laid in the rest for same. The lever H is depressed to bring the cushion *e* of the plug J into position to hold the opposing label on the bottle, while the picker for said label has rotary motion to clear the same, and by means of the cam-disks T the yokes U are depressed to cause the wipers V to attack the aforesaid label and insure its adhesion to said bottle, paste having been previously supplied to the under side of aforesaid label. The label-pickers take paste from the roller A', and this roller has intermittent rotation due to friction therewith of the said pickers passing the same, provision being had for yield of the paste-holder. However, it is practical to provide for continuous rotation of the paste-rollers. The cross-head K feeds the label-holder up to the label-pickers, and there is reciprocative motion on the part of the plate of said label-holder due to the motion of said cross-head and the expansive force of the spring incased by the plate-shank and the cross-head shank. Hence all the labels of a pile in the holder will be picked up one by one. The cushioned plug J has yield against spring resistance to compensate for the depression of the lever H further than is necessary to bring a pasted label into contact with a bottle in position on the stationary rest for same, and the location of the label on the bottle is determined by the adjustment of the bottle-stop in connection with said rest.

Having thus described my invention, what I claim as new, and desire to secure by Letters Patent, is—

1. In a bottle-labeling machine, the combination of a vertically-reciprocative label-holder, label-pickers having intermittent rotary motion past the label-holder, means by which paste is supplied to the label-pickers on their way to aline with said label-holder, a bottle-rest, means for transferring a label paste side down from a label-picker to a bottle in the rest, and reciprocative wipers by which said label is caused to adhere to the bottle.

2. In a bottle-labeling machine, the combination of a vertically-reciprocative label-holder, label-pickers having intermittent rotary motion past the label-holder, a paste-feeder in the path of the label-pickers on their way to aline with said label-holder, a bottle-rest, means for transferring a label paste side down from a label-picker to a bottle in the rest, and reciprocative wipers by which said label is caused to adhere to the bottle.

3. In a bottle-labeling machine, the combination of a vertically-reciprocative yielding label-holder, label-pickers having intermittent rotary motion past the label-holder, means by which paste is supplied to the label-pickers on their way to aline with said label-holder, a bottle-rest, means for transferring a label paste side down from a label-picker to a bottle in the rest, and reciprocative wipers by which said label is caused to adhere to the bottle.

4. In a bottle-labeling machine, the combination of a vertically-reciprocative label-holder, label-pickers having intermittent rotary motion past the label-holder, means by which paste is supplied to the label-pickers on their way to aline with said label-holder, a bottle-rest, a vertically-reciprocative cushion by which a label is arrested paste side down on a bottle in the rest, and reciprocative wipers by which said label is caused to adhere to the bottle.

5. In a bottle-labeling machine, the combination of a vertically-reciprocative label-holder, label-pickers having intermittent rotary motion past the label-holder, means by which paste is supplied to the label-pickers on their way to aline with said label-holder, a bottle-rest, a vertically-reciprocative casing, a hollow plug having vertical play in the casing, a spiral spring incased by the plug and casing, a cushion on the outer end of said plug operative to arrest a label paste side down on a bottle in the rest, and reciprocative wipers by which said label is caused to adhere to the bottle.

6. In a bottle-labeling machine, the combination of a vertically-reciprocative label-holder, label-pickers having intermittent rotary motion past the label-holder, a yielding paste-holder, a paste-roller in the paste-holder and in the path of the label-pickers on their way to aline with the label-holder, another roller opposing the one aforesaid and having pivotally-adjustable support to regulate its tension, a bottle-rest, means for transferring a label paste side down from a label-picker to a bottle in the rest, and reciprocative wipers by which said label is caused to adhere to the bottle.

7. In a bottle-labeling machine, the combination of a label-holder comprising a plate having a depending hollow shank, a cross-head having a hollow shank in which the one aforesaid is vertically guided, a guide for the cross-head shank, a spiral spring incased in said shanks, an eccentric revoluble in the cross-head, label-pickers having intermittent rotary motion past the label-holder, means by which paste is supplied to the label-pickers on their way to aline with said label-holder, a bottle-rest, means for transferring a label paste side down from a label-picker to a bottle in the rest, and reciprocative wipers by which said label is caused to adhere to the bottle.

8. In a bottle-labeling machine, the combination of a vertically-reciprocative label-holder, label-pickers comprising parallel bars centrally secured on a shaft having intermittent rotary motion and plates attached to the ends of the arms; means by which paste is supplied to the label-pickers on their way to aline with the label-holder, a bottle-rest, means for transferring a label paste side down from a label-picker to a bottle in the rest, and reciprocating wipers by which the label is caused to adhere to the bottle.

9. In a bottle-labeling machine, the combination of a vertically-reciprocative label-holder, label-pickers secured on a shaft to which intermittent rotary motion is imparted, means by which paste is supplied to the label-pickers on their way to aline with the label-holder, a bottle-rest, means for tranferring a label paste side down from a label-picker to a bottle in the rest, shaft-straddling yokes for which guides are provided and which have angular upper shanks, wipers attached to the yoke-shanks and which operate to cause adherence of the label on said bottle, disks fast on said shaft, and projections on said yokes engaging cam-grooves in the disks.

10. In a bottle-labeling machine, the combination of a vertically-reciprocative label-holder, label-pickers having intermittent rotary motion past the label-holder, means by which paste is supplied to the label-pickers on their way to aline with said label-holder, a bottle-rest, a lever, a casing with which the lever is connected, a hollow plug guided in the casing, a spiral spring incased by the plug and casing, a cushion on the outer end of the plug operative to arrest a label paste side down on a bottle in the rest, a pitman connected to said lever, and a ring in connection with the pitman, an eccentric revoluble in the ring, and reciprocative wipers by which said label is caused to adhere to the bottle.

11. In a bottle-labeling machine, the combination of a vertically-reciprocative label-holder, label-pickers having intermittent rotary motion past the label-holder, means by which paste is supplied to the label-pickers on their way to aline with said label-holder, a bottle-rest, a bottle-stop adjustable in the rest, means for transferring a label paste side down from a label-picker to a bottle in said rest, and reciprocative wipers by which the label is caused to adhere to the bottle.

12. In a bottle-labeling machine, the combination of a vertically-reciprocative label-holder, a shaft having intermittent rotary motion, means for preventing overrunning of the shaft, label-pickers radiating from said shaft, means by which paste is supplied to the label-pickers on their way to aline with the label-holder, a bottle-rest means for transferring a label paste side down from a label-picker to a bottle in the rest, and reciprocating wipers by which the label is caused to adhere to the bottle.

13. In a bottle-labeling machine, the combination of a vertically-reciprocative label-holder, a shaft having intermittent rotary motion and provided with a squared head, a spring arranged to bear upon the shaft-head, label-pickers radiating from said shaft, means by which paste is supplied to the label-pickers on their way to aline with the label-holder, a bottle-rest, means for transferring a label paste side down from a label-picker to a bottle in the rest, and reciprocating wipers by which the label is caused to adhere to the bottle.

14. In a bottle-labeling machine, the combination of a main shaft provided with eccentrics and a crank, a cross-head on one of the eccentrics, a label-holder having a depending shank in vertically-yielding engagement with a shank of the cross-head, a counter-shaft provided with a pinion, a gear-wheel in mesh with the pinion and provided with a ratchet extension, a crank, a pawl in connection with this crank and engaging the ratchet, a link-rod connecting the two cranks aforesaid, parallel arms fast on the counter-shaft midway of their length, plates secured to the ends of the arms, a paste-feed in the path of the plates on their way to aline with the label-holder, a pitman having ring connection with one of the main-shaft eccentrics, a lever connected to the pitman, a casing supported by the lever, a hollow plug guided in the casing, and having its outer end provided with a cushion, a spiral spring incased by the plug and casing, a bottle-rest under the cushion, disks fast on said counter-shaft and provided with cam-grooves, sliding devices having projections engaging the cam-grooves of the disks, and label-wipers carried in connection with said sliding devices.

In testimony that I claim the foregoing I have hereunto set my hand, at Sheboygan, in the county of Sheboygan and State of Wisconsin, in the presence of two witnesses.

ALFRED O. GUTSCH.

Witnesses:
SIMON GILLEN,
MATILDA LORENZ.